United States Patent
Yamaguchi et al.

[11] Patent Number: 5,990,591
[45] Date of Patent: Nov. 23, 1999

[54] PERMANENT MAGNET TYPE SYNCHRONOUS MOTOR

[75] Inventors: Yasuo Yamaguchi; Masahiro Hasebe; Satoru Wakuta, all of Anjo, Japan

[73] Assignee: Aisin Aw Co., Ltd., Japan

[21] Appl. No.: 09/027,223

[22] Filed: Feb. 20, 1998

[30] Foreign Application Priority Data

Feb. 21, 1997 [JP] Japan ..................................... 9-037945
Nov. 18, 1997 [JP] Japan ..................................... 9-317120

[51] Int. Cl.⁶ .......................... H02K 21/12; H02K 19/00; H02K 1/00; H02K 1/22
[52] U.S. Cl. .......................... 310/156; 310/162; 310/261; 310/216
[58] Field of Search .................... 310/156, 162, 310/261, 216, 217, 218, 265

[56] References Cited

U.S. PATENT DOCUMENTS

| | | | |
|---|---|---|---|
| 3,657,582 | 4/1972 | Phelon | 310/156 |
| 5,631,512 | 5/1997 | Kawabata et al. | 310/156 |
| 5,760,520 | 6/1998 | Hasebe et al. | 310/261 |
| 5,811,904 | 9/1998 | Tajima et al. | 310/156 |

*Primary Examiner*—Nestor Ramirez
*Assistant Examiner*—Dang Dinh Le
*Attorney, Agent, or Firm*—Lorusso & Loud

[57] ABSTRACT

A permanent magnet type synchronous motor includes an iron core rotor having a plurality of holes which are circumferentially spaced, permanent magnets mounted in the holes, an iron core stator and coils arranged in the stator iron core. The permanent magnets are defined by a flat surface extending tangentially of the rotor, tapered surfaces formed at both ends of the flat surface and extending obliquely outward in a direction approaching each other, and an arcuate surface joining the two tapered surfaces. Each permanent magnet is supported by tapered surfaces formed at opposing ends of the holes and extending obliquely and radially outward in a direction approaching each other. When the rotor is rotated, the centrifugal force is received at the tapered surfaces of the holes, rather than at their arcuate portion.

4 Claims, 8 Drawing Sheets

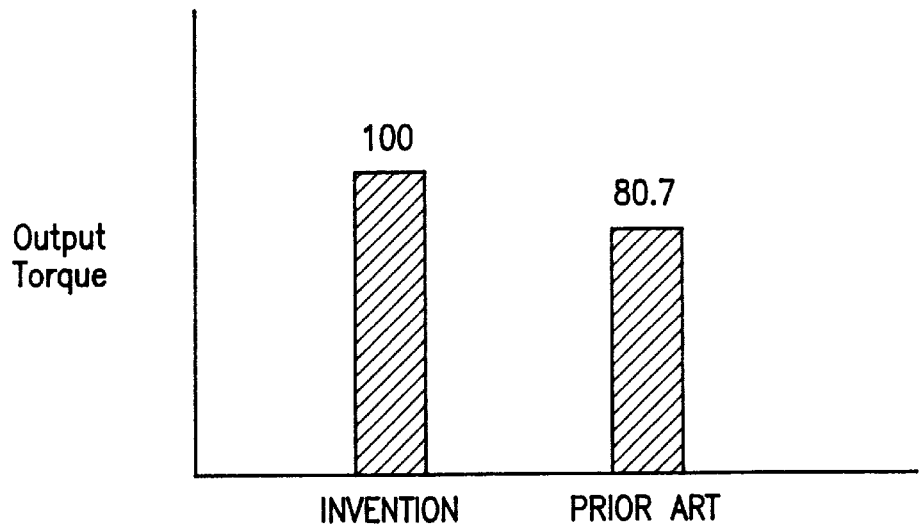
FIG. 4
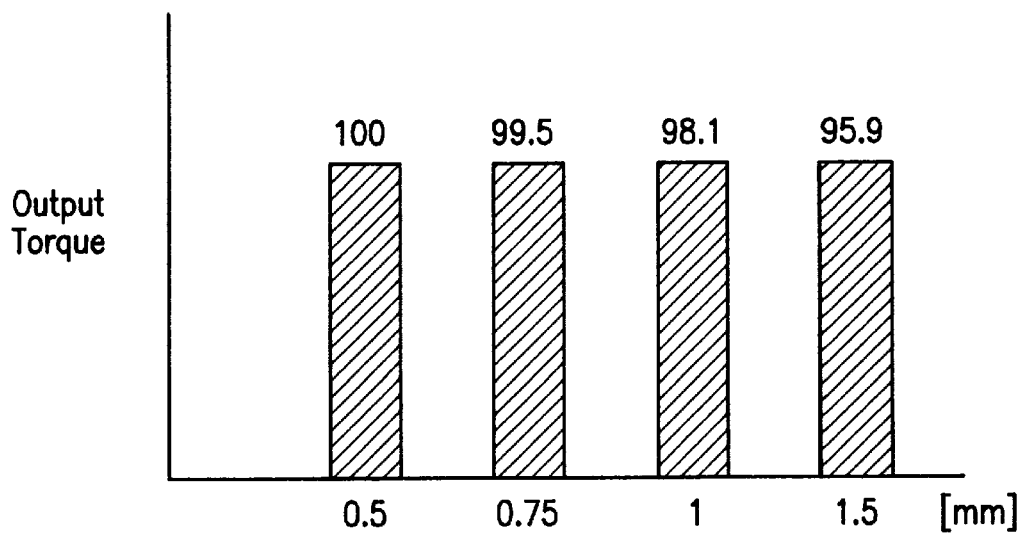
FIG. 5  THICKNESS OF ARCUATE PORTION

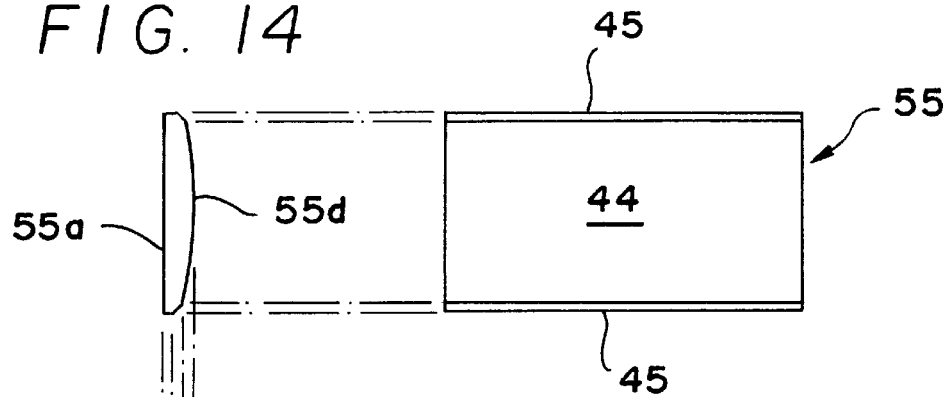
FIG. 14
FIG. 13
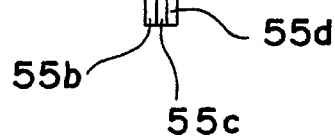
FIG. 15
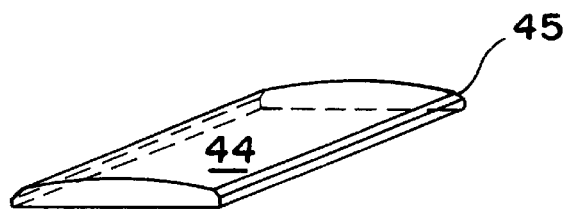
FIG. 16

PERMANENT MAGNET TYPE SYNCHRONOUS MOTOR

BACKGROUND OF THE INVENTION

1. Field of the Invention

The present invention relates to a permanent magnet type synchronous motor.

2. The Related Art

A permanent magnet type synchronous motor includes a rotatably supported rotor and a stator arranged around the rotor. The rotor includes an iron core and permanent magnets arranged circumferentially around the circumference direction of the iron core. The stator also includes an iron core, with coils arranged in a plurality of locations on the circumference of the stator iron core.

In a permanent magnet type synchronous motor of a surface magnet type, having sector-shaped permanent magnets exposed at the outer circumferential edge of the rotor iron core, the relative magnetic permeability of the permanent magnets is substantially 1 so that the effective air gap as taken from the stator side, is the sum of the gap between the stator and the rotor and the thickness of the permanent magnets. This lowers the reaction of the stator to make field-weakening control (by control of current to the coils in the stator) difficult.

There has been disclosed (in Published Japanese Patent Application laid-open No. 8-107639) a permanent magnet type synchronous motor of an internal magnet type in which the permanent magnets are buried within the rotor iron core. In this case, the effective air gap, as taken from the stator side, is equal to the gap between the stator and the rotor so that the responsiveness of the stator is increased to facilitate field-weakening control.

Since permanent magnets having a high magnetic resistance are arranged on a d-axis magnetic path, and not on a q-axis magnetic path, the magnetic resistance changes with the circumferential position so that a q-axis inductance Lq grows larger than a d-axis inductance Ld to thereby exhibit counter saliency. By feeding a proper d-axis current, therefore, it is possible to generate not only the magnet torque on the basis of the magnetic flux of the permanent magnets and the q-axis current, but also the reaction torque, to thereby reduce the q-axis current necessary for generating the torque.

In the aforementioned permanent magnet type synchronous motor, however, the portions of the iron core radially outward of the permanent magnets must be enlarged so that a sufficient strength may be provided against the centrifugal force exerted on the permanent magnets when the synchronous motor is rotated at a high speed. However, both the centrifugal force due to the weight of the rotor portions radially outward of the permanent magnets and the centrifugal force generated in the permanent magnets are exerted on the relative thin portions of the core radially outward of the end portions of the permanent magnets, so that the strength of the rotor iron core is lowered.

It is, therefore, conceivable to increase the thickness of the rotor portions radially outward of the end portions of the permanent magnets. In this case, however, the leakage of magnetic flux increases so much that a high torque cannot be generated and, moreover, a distortion is caused in the magnetic flux distribution in the gaps, which distortion generates harmonic components in the magnetic flux density waveforms and thereby causes torque oscillations.

SUMMARY OF THE INVENTION

Accordingly, an object of the present invention is to provide a solution to the aforementioned problems of the permanent magnet type synchronous motor, to provide a permanent magnet type synchronous motor in which the strength of the rotor iron core is increased and a high torque is generated to suppress the torque oscillations.

According to the present invention, therefore, there is provided a permanent magnet type synchronous motor which includes: a rotatably supported rotor iron core having holes at a plurality of circumferentially spaced locations which are "buried" within the iron core, i.e. radially inward of the outer circumferential surface of the iron core; permanent magnets mounted in the holes; an iron core stator; and coils arranged in the stator iron core.

Each permanent magnet is defined by a flat surface extending tangentially relative to the rotor, tapered surfaces formed at the opposing ends of the flat surface and extending obliquely outward in a direction approaching each other, and an arcuate surface joining the two tapered surfaces. Each magnet is supported by tapered surfaces formed at opposing ends of the holes and extending obliquely outward in a direction approaching each other.

In a preferred embodiment of the permanent magnet type synchronous motor of the invention, moreover, a clearance is formed between the arcuate surface of the permanent magnet and the arcuate surface of the hole in the rotor iron core containing the permanent magnet.

In still another preferred embodiment of the invention, the portions adjacent tapered surfaces and the arcuate surface of the permanent magnet are magnetized to one polarity whereas the portion adjacent the straight (flat) surface of the permanent magnet is magnetized with the opposite polarity.

In still another embodiment of the invention the permanent magnet type synchronous motor includes: a rotatably supported rotor including a rotor iron core and permanent magnets arranged in the vicinity of the outer circumferential surface of the rotor iron core; and a stator arranged around the outer circumference of the rotor and including a stator iron core and coils wound on the stator iron core, wherein each permanent magnet includes a main magnetic pole portion, and auxiliary pole portions integral with the main magnetic pole portion and located at ends of the main magnetic pole portion. These auxiliary pole portions are bent toward each other and are magnetized to the same polarity as that of the main magnetic pole portion, so that the magnetic paths at the ends of the main magnetic pole portion are saturated by the magnetic flux emanating from the auxiliary pole portions.

In still another embodiment, the auxiliary pole portions are tapered.

In yet another preferred embodiment of the invention, holes matching the shape of the permanent magnets and defined in part by opposing tapered surfaces are formed in a plurality of circumferentially spaced locations in the rotor iron core, and the permanent magnets are individually mounted in the holes and supported by the opposing tapered surfaces of the holes.

In still another embodiment of the invention, the stator iron core has internal slots defining a slot pitch p and the main magnetic pole portion of each permanent magnet has a circumferential length extending through an angle $\theta$, wherein $\theta$ is defined as:

$\theta = (n + \frac{1}{2}) \cdot p$ wherein n is an integer.

BRIEF DESCRIPTION OF THE DRAWINGS

FIG. 4 is a bar graph comparing the output torque of the permanent magnet type synchronous motor of the present invention with a prior art motor.

FIG. 5 is a bar graph of the output torque versus thickness of the arcuate portion of the permanent magnet type synchronous motor according to the first embodiment of the invention.

FIG. 13 is a planar view of a permanent magnet in a preferred embodiment of a synchronous motor of the present invention.

FIG. 14 is an end view of the permanent magnet shown in FIG. 13.

FIG. 15 is a side view of the permanent magnet shown in FIG. 13.

FIG. 16 is a perspective view of the permanent magnet shown in FIG. 13.

DESCRIPTION OF THE PREFERRED EMBODIMENTS

Various preferred embodiments of the present invention will now be described in detail with reference to the accompanying drawings.

Figure 2:
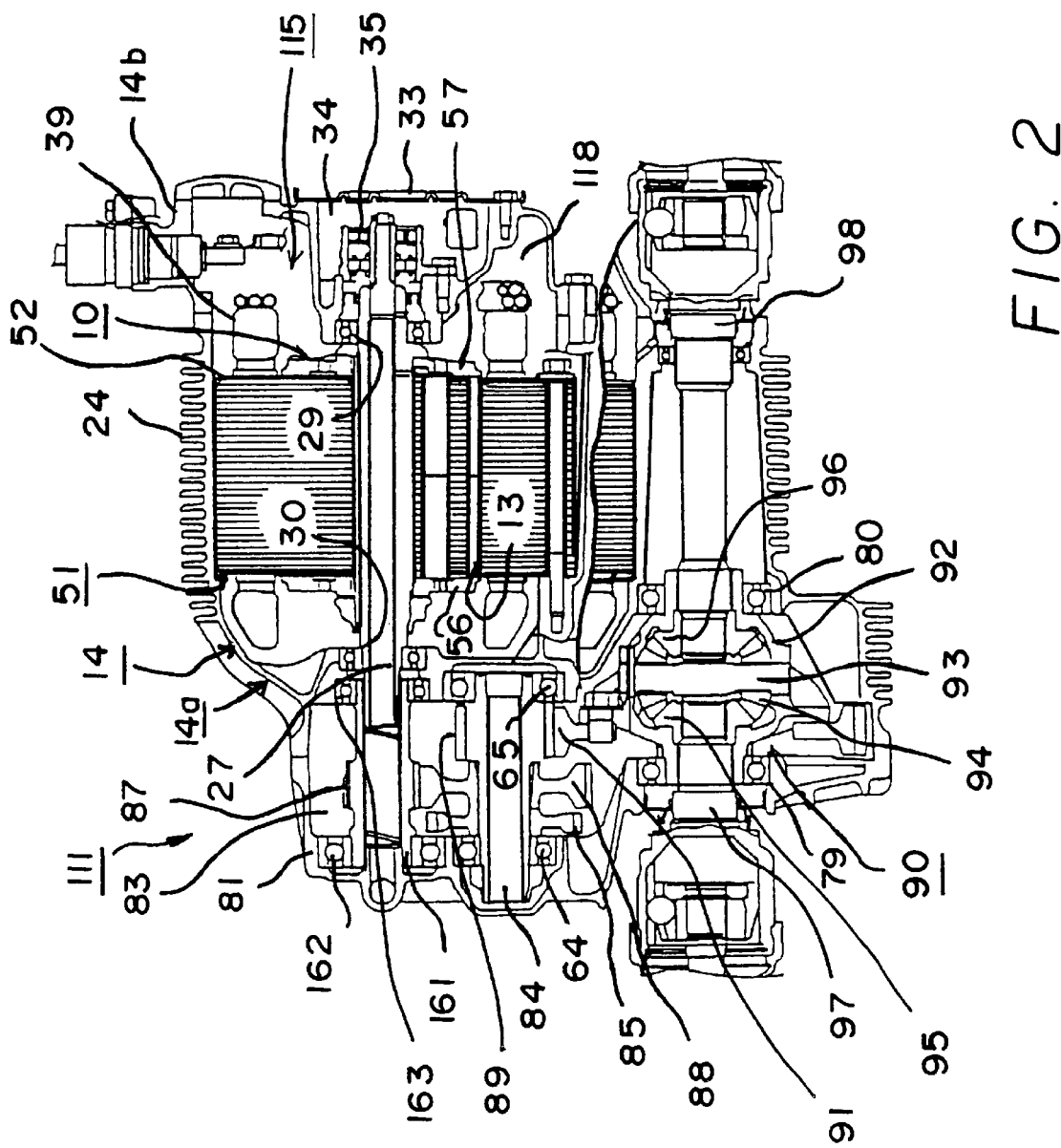
FIG. 2 is a longitudinal sectional view of a permanent magnet type synchronous motor according to the first embodiment of the invention.

FIG. 2 illustrates a first embodiment wherein reference numeral 111 designates a motor assembly, and numeral 14 designates a motor case housing a permanent magnet type synchronous motor 115.

The motor case 14 is composed of a cylindrical main portion 14a closed at one end (left end in the drawing) and open at the other end (right end in the drawing) which is closed by a cover portion 14b to define a sealed motor chamber 118. A plurality of cooling fins 24 are formed on the outer circumference of the cylindrical portion 14a.

Moreover, the cylindrical main portion 14a and the cover portion 14b have center holes through which is extended a motor shaft 27 rotatably supported by bearings 29 and 30. Further, the cover portion 14b is recessed axially inward around its center hole, and this recess is closed by a cover member 33 to form a sensor chamber 34.

Sensor chamber 34 contains a resolver 35 for detecting the position of the magnetic poles of the permanent magnet type synchronous motor 115 as the motor shaft 27 rotates.

The permanent magnet type synchronous motor 115 includes: a rotor 10 mounted on the motor shaft 27 approximately axially centered thereon, for rotation together with the motor shaft 27; and a stator 51 fixed on the inner circumference of the cylindrical main portion 14a of motor case 14, and opposed to the rotor 10. The stator 51 is composed of a stator iron core 52, and three-phase (i.e., U-phase, V-phase and W-phase) coils 39 wound on the stator iron core 52.

As a result, the rotor 10 can be rotated by feeding the individual coils 39 with the three-phase AC currents which are generated by an inverter (not shown).

The rotor 10 is composed of: a rotor iron core (not shown) fitted on the motor shaft 27 and formed of a plurality of laminated electromagnetic steel sheets; and permanent magnets 13 arranged in the vicinity of the outer circumferential edge of the rotor iron core. The permanent magnets 13 are arranged at a plurality of equally spaced circumferential positions in the rotor 10 and are fixed in place by end plates 56 and 57 arranged at the opposing ends of the rotor 10, to establish the magnetic poles.

A rear case 81 is attached to the one end (closed end, left end in the drawing) of the cylindrical main portion 14a to form a torque transmission chamber 83 between the bottom of the cylindrical portion 14a and the rear case 81. The torque transmission chamber 83 houses a sleeve-like transmission shaft 161 which is coaxially fitted on the motor shaft 27 by means of splines. The transmission shaft 161 is rotatably supported by bearings 162 and 163. Also housed within the torque transmission chamber 83, in parallel with the transmission shaft 161, is a counter shaft 84 which is rotatably supported by bearings 64 and 65.

A counter gear 87 is fixed on the transmission shaft 161, and a parking gear 85 and a counter driven gear 88 are fixed on the counter shaft 84, such that the counter drive gear 87 and the counter driven gear 88 mesh with each other.

In addition, an output gear 89 is arranged on the counter shaft 84, and its rotation is transmitted to a differential unit 90. The differential unit 90 is composed of: a differential case 92 equipped with a ring gear 91 on its outer circumference and rotatably supported through bearings 79 and 80; a pinion shaft 93 fixed in the differential case 92; a pinion 94 rotatably supported by the pinion shaft 93; and left and right side gears 95 and 96 meshing with the pinion 94. As a result, the differential unit 90 transmits the rotation, as received by the ring gear 91, separately to left and right drive shafts 97 and 98.

Figure 1:
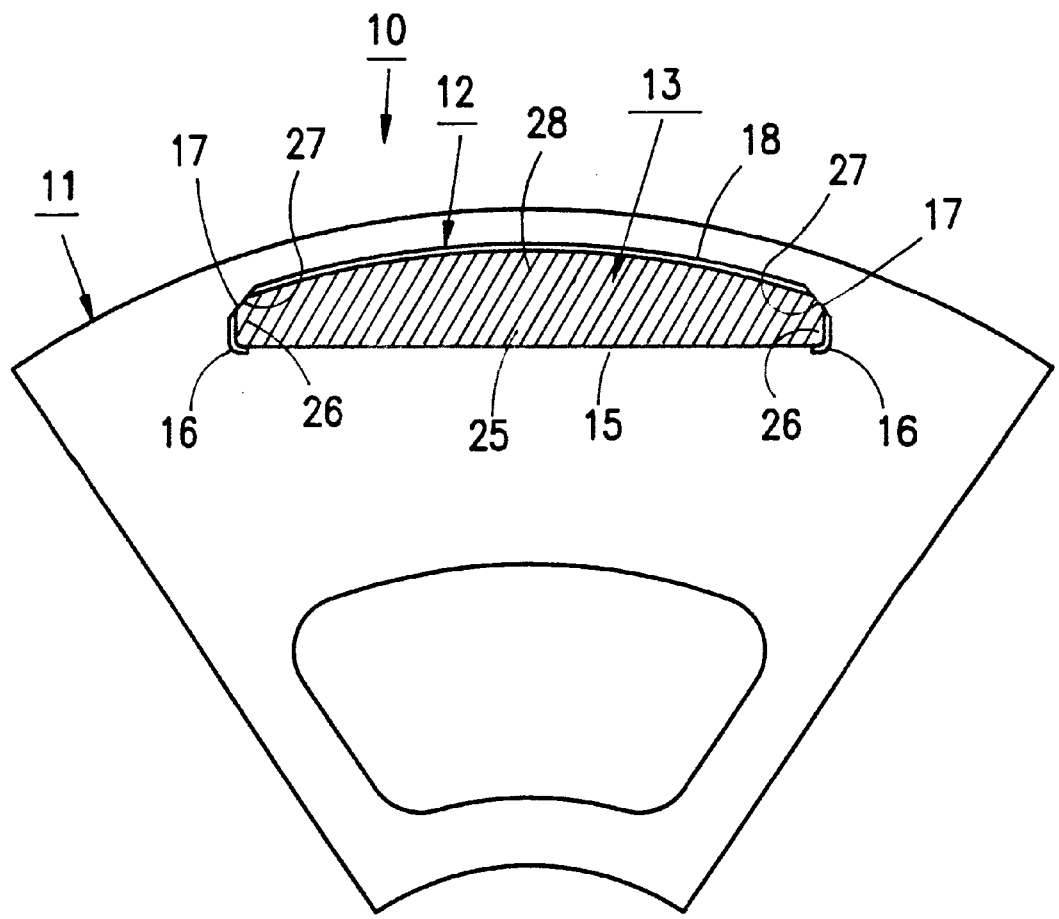
FIG. 1 is a sectional view of a portion of a rotor in a first embodiment of the invention.
Figure 3:
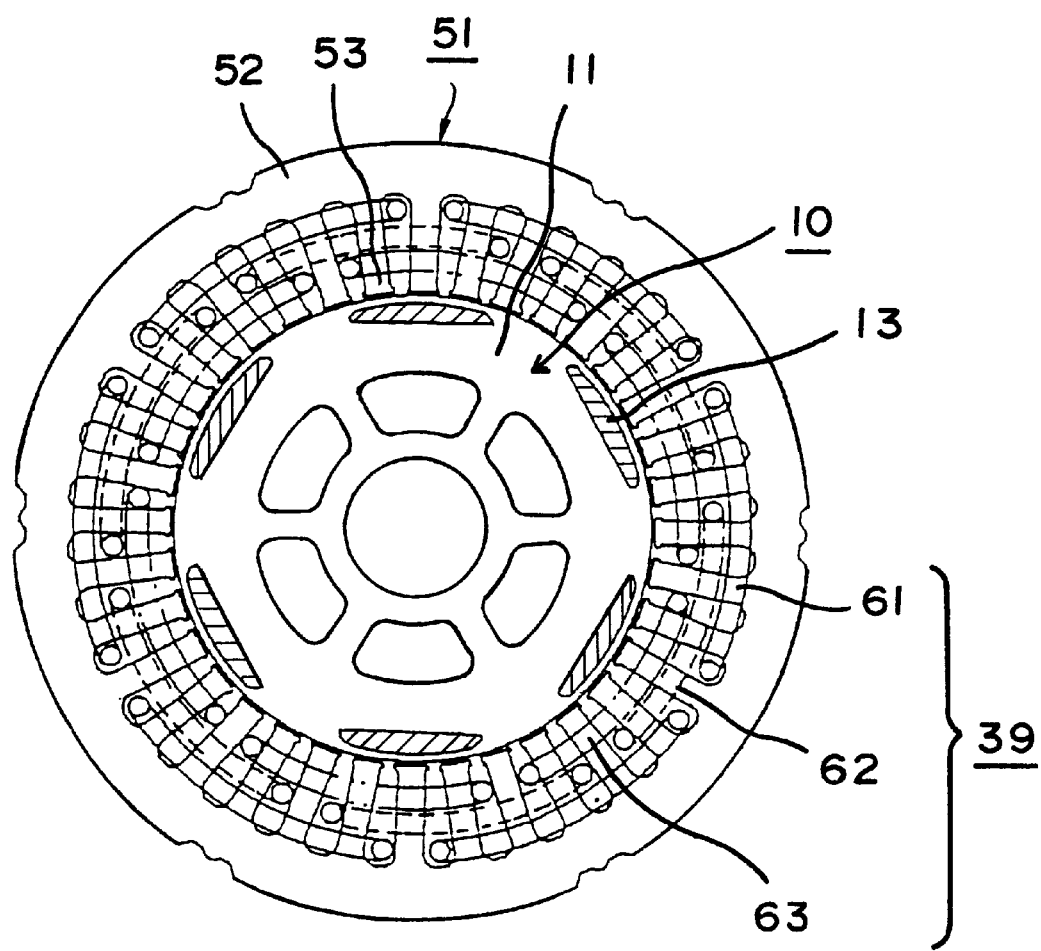
FIG. 3 is a transverse sectional view of the permanent magnet type synchronous motor according to the first embodiment of the invention.

The permanent magnet type synchronous motor 115 will now be further described with reference to FIGS. 1 and 3. In these figures, reference numeral 10 designates a rotor and numeral 11 designates a rotor iron core. The stator 51 is arranged around the rotor 10. Reference numeral 52 designates a stator iron core, and numeral 53 designates stator poles which protrude from the inner circumferential side of the stator iron core 52 toward the rotor 10. In the stator iron core 52 are arranged the coils 39 which are composed of a U-phase winding 61, a V-phase winding 62 and a W-phase winding 63. At a plurality (here 6) of locations near the outer circumference of the rotor iron core 11, there are formed holes 12 having a cross-section similar to the letter "D". The permanent magnets 13, also having a cross-section of similar "D" shape, are inserted within the holes 12.

Each hole 12 is defined by: a straight surface (flat surface) 15 extending in the tangential direction; cuts 16 formed at opposing ends of the straight portion 15; tapered surfaces 17 each extending obliquely outward from the cuts 16 in a direction approaching each other; and an arcuate surface 18 extending approximately in parallel with the outer peripheral edge of the rotor iron core 11.

Each permanent magnet 13 is shaped to match the shape of the hole 12 and is defined by: a straight surface (flat surface) 25 extending in the tangential direction; generally radially extending surfaces 26 formed at opposing ends of the straight surface 25; tapered surfaces 27 each extending obliquely outward from the radial surfaces 26 in a direction approaching each other; and an arcuate surface 28 joining the two tapered surfaces 27 and extending approximately in parallel with the outer circumferential surface of the rotor iron core 11.

Moreover, the hole 12 and the permanent magnet 13 are so sized that the respective tapered surfaces 17 and 27 butt against each other when the permanent magnet 13 is inserted into the hole 12, while leaving a small clearance between the arcuate surfaces 18 and 28. As a result, the permanent magnets 13 are supported at tapered surfaces 17, and, when the rotor 10 is rotated, the centrifugal force which is generated in the permanent magnets 13 and is applied to the tapered surfaces 17 but not to the arcuate surfaces 18. Thus, the arcuate surfaces 18 do not contribute to the support of the permanent magnets 13 which are thereby protected against breakage. Moreover, the small clearance between the individual arcuate surfaces 18 and 28 allows the arcuate surfaces 18 and 28 to be finished (machined) without need for any high degree of precision.

Moreover, the tapered surfaces 17 are formed inclined from the cut portions 16 in a direction of approaching each other, so that a sufficient thickness can be retained between the tapered surfaces 17 and the outer circumferential surface of the rotor iron core 11. As a result, the rotor portions adjacent tapered surfaces 17 will not break even if the rotor 10 is rotated at a high speed to thereby apply a large centrifugal force to the portions adjacent tapered surface 17. Moreover, the obtuse angles between the cut portions 16 and the tapered portions 17 and between the tapered portions 17 and the arcuate portion 18, serve to prevent the stress from becoming concentrated. This makes it possible to enhance the strength of the rotor iron core 11 adjacent the tapered surfaces 17.

Here, portions of core 11 overlay the permanent magnets 13, i.e. radially outward of the permanent magnets 13, so that if the permanent magnets 13 become broken or smashed due to their own internal defects or by excessive rotations of the rotor 10, the resulting fragments are not scattered. It is sufficient for the arcuate core portions overlying surfaces 18 to merely cover the permanent magnets 13, so that their radial size can be reduced, allowing a reduction of the radial dimension of the tapered surfaces 17. As a result, leakages of magnetic flux from the arcuate portions 28 can be reduced to increase the amount magnetic flux passing through the gap between the stator 51 and the rotor 10, so that the torque corresponding to that amount is added to the torque generated by the permanent magnet type synchronous motor 115 (FIG. 2). In addition, the distortion in the magnetic flux distribution in the gap can be remarkably reduced to reduce the harmonic components in the waveforms of the magnetic flux density, to thereby prevent torque oscillations.

In the vicinity of the tapered surfaces 17, moreover, the rotor iron core 11 is saturated to suppress the passage of the magnetic flux of the portions adjacent surfaces 18 near the tapered surfaces 17. This suppresses the short-circuiting of the magnetic flux of the arcuate portions of the rotor iron core 11, thereby increasing the amount of magnetic flux which passes through the gap between the stator 51 and the rotor 10. As a result, the motor torque can be increased.

Here, the portions of the permanent magnets 13 adjacent tapered surfaces 27 and arcuate surface 28 of are magnetized with one polarity, and the portions of the permanent magnets 13 adjacent flat surface 25 are magnetized to have the opposite polarity.

If the coils 39 receive a low current as in the case when the permanent magnet type synchronous motor 115 is driven in a low torque region, a portion of the magnetic flux at the arcuate surface 28 does not pass through the stator iron core 52 but, rather, short-circuits the rotor iron core 11. This short-circuiting and the substantial reduction in the effective air gap which lowers the magnetic resistance act together to lower the counter electromotive force, so that the rotary speed of the rotor 10 can be increased without raising the supply voltage. As a result, the d-axis current, which is a field-weakening control, can be accordingly reduced to enhance the efficiency of the permanent magnet type synchronous motor 115.

In assembling the permanent magnet type synchronous motor 115, the task of inserting the permanent magnets 13 into the holes 12 after the permanent magnets 13 are magnetized is extremely difficult because the magnetic forces attract the permanent magnets 13 to the rotor core 11. Therefore, the permanent magnets 13 are inserted into the holes 12 before their magnetization and a pulsed magnetic field is then generated to magnetize the permanent magnets 13. This facilitates the magnetization because the radial dimension of the arcuate surface 28 is small.

The characteristics of the permanent magnet type synchronous motor 115 of the present invention can be better understood by comparison with another permanent magnet type synchronous motor as illustrated in FIG. 4. As is apparent from FIG. 4, if the permanent magnet type synchronous motor 115 (of FIG. 2) has an output torque of 100, the output torque of the permanent magnet type synchronous motor of the related art is 80.7. The data of FIG. 4 was generated by motors wherein the thickness of the core portions overlying arcuate surfaces 18 (see FIG. 1) in the permanent magnet type synchronous motor 115 of the invention and the thickness between the outer circumferential surface of the rotor iron core and the permanent magnets in the more conventional ("related art") design were both 1.5 mm to make the permanent magnets equal in volume, and to thereby generate the same level of counter electromotive forces.

As is apparent from FIG. 5, if the permanent magnet type synchronous motor 115 (of FIG. 2) has an output of 100 for a thickness of 0.5 mm of the arcuate portions of its rotor, the output torques are 99.5, 98.1 and 95.9, for arcuate portion thicknesses 0.75 mm, 1 mm and 1.5 mm, respectively.

Figure 6:
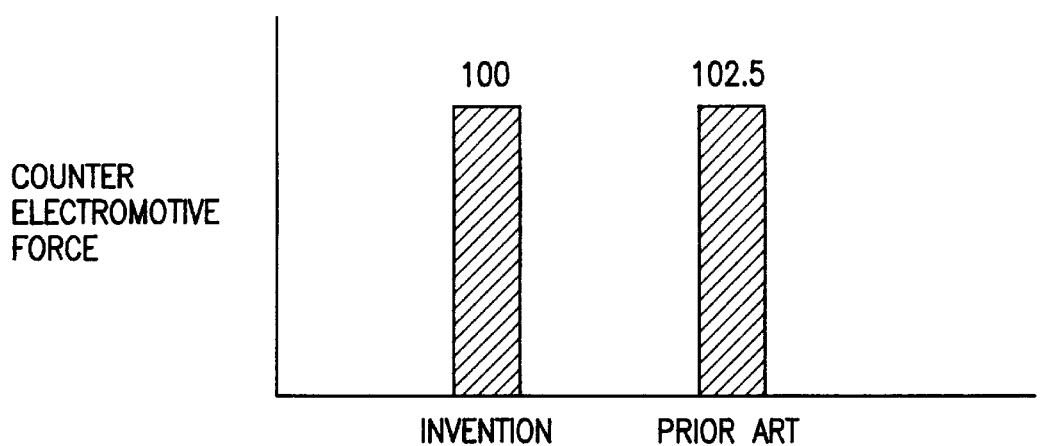
FIG. 6 is a bar graph comparing the counter electromotive force of the permanent magnet type synchronous motor of the present invention with a prior art motor.

FIG. 6 shows that, if the permanent magnet type synchronous motor has a counter electromotive force of 100, the counter electromotive force in the permanent magnet type synchronous motor of the related art, with permanent magnets of the same mass, is 102.5. Here also, both the thickness of the core arcuate portions of the permanent magnet type synchronous motor 115 of the invention and the thickness of the magnetic pole upper core portions in the permanent magnet type synchronous motor of the related art were 1.5 mm to make the magnets equal in volume, to thereby generate counter electromotive forces at the same level.

Figure 7:
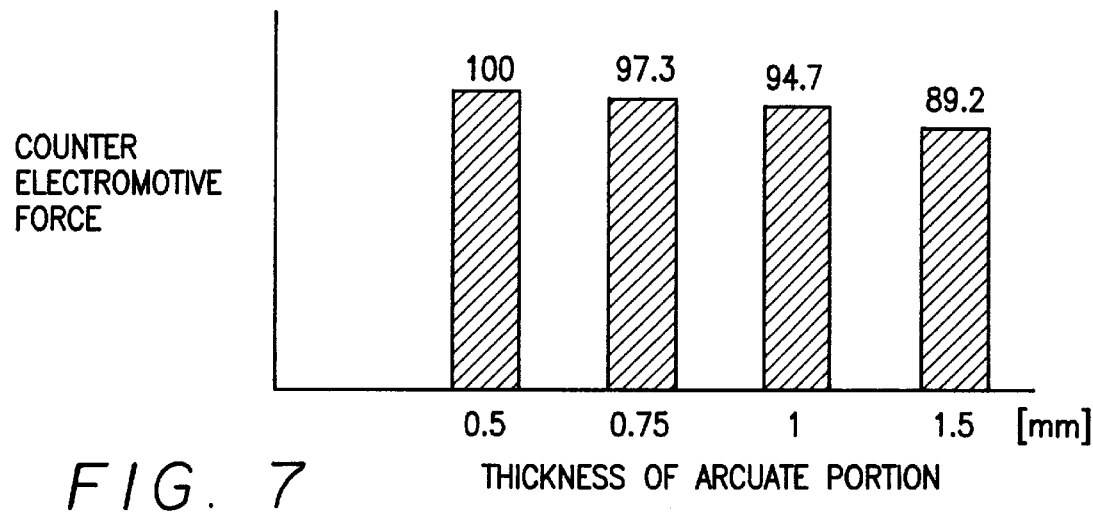
FIG. 7 is a bar graph of the counter electromotive force versus thickness of the arcuate portion of the permanent magnet in the synchronous motor according to the first embodiment of the invention.

FIG. 7 shows that, if the permanent magnet type synchronous motor 115 (of FIG. 2) has a counter electromotive force of 100 with a thickness of 0.5 mm of the arcuate core portions, the counter electromotive forces are 97.3, 94.7 and 89.2 for arcuate portion thicknesses 0.75 mm, 1 mm and 1.5 mm, respectively.

Figure 8:
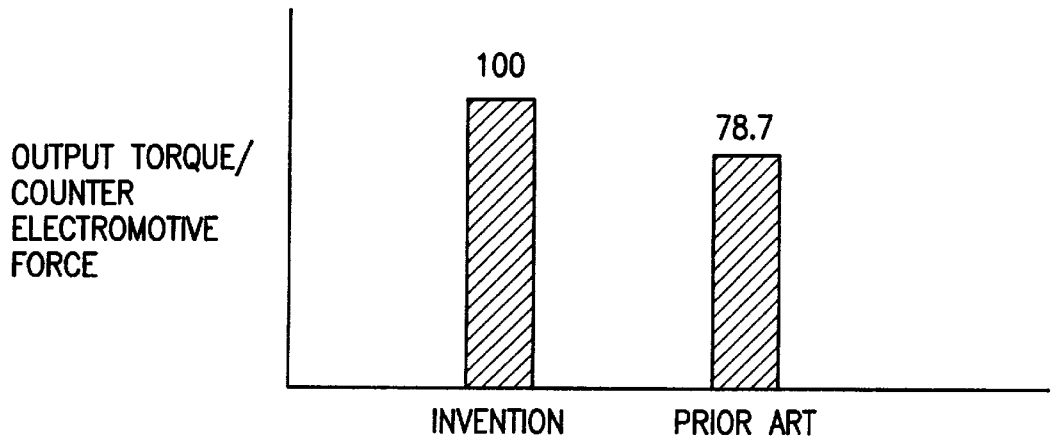
FIG. 8 is a bar graph comparing the ratio of output torque to counter electromotive force of the permanent magnet type synchronous motor of the present invention with a prior art motor.

As is apparent from FIG. 8, if the permanent magnet type synchronous motor has a ratio of output torque to counter electromotive force of 100, the ratio of output torque to counter electromotive force by the permanent magnet type synchronous motor of the conventional motor ("related art") is 78.7, where the thickness of the arcuate core portions in the permanent magnet type synchronous motor 115 of the invention and the thickness of the magnetic pole upper portions of the iron core in the permanent magnet type synchronous motor of the more conventional design are both 1.5 mm whereby the magnets of both motors are equal in volume and generate counter electromotive forces at the same level.

A second embodiment of the invention will now be described with reference to FIGS. 9–12.

Figure 9:
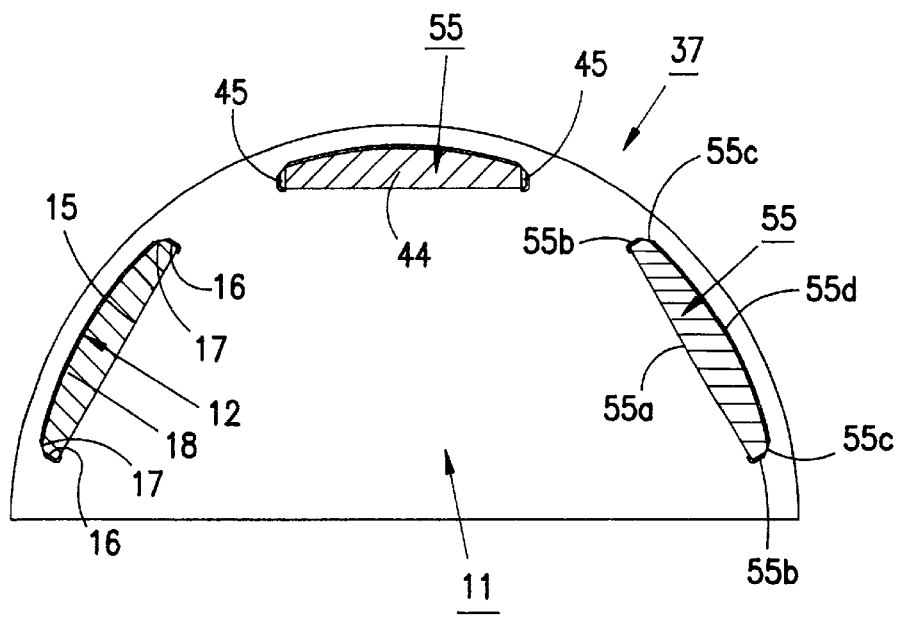
FIG. 9 is an enlarged view of a portion of the rotor of a second embodiment of the invention.

FIG. 9 shows a rotor iron core 11 formed of laminated electromagnetic steel sheets, a rotor 37 and permanent magnets 55. In the rotor, iron core 11 is formed with axially extending holes for receiving and holding the permanent magnets 55.

Each permanent magnet 55 is formed approximately semicylindrical in shape and is defined by: a straight (flat) surface 55a extending in the tangential direction; radially extending surfaces 55b formed at both ends of the straight surface 55a; tapered surfaces 55c each extending obliquely outward from the radial surfaces 55b in a direction approaching each other; and an arcuate surface 55d joining the two tapered surfaces 55c and extending approximately in parallel with the outer circumferential surface of the rotor iron core 11.

A main magnetic pole portion 44 is formed between the straight surface 55a and the arcuate surface 55d. Auxiliary pole portions 45 are formed at the opposing ends adjacent to and integral with the main magnetic pole portion 44, with the bends at the junctures between the tapered portions 55c and the main magnetic pole portion 44 forming magnetic boundaries. Both the main magnetic pole portion 44 and the auxiliary pole portions 45 are magnetized with the same polarity. In this embodiment, the areas (mass) adjacent tapered surfaces 55c and the arcuate surface 55d are magnetized with one polarity whereas the area adjacent straight surface 55a is magnetized with the opposite polarity.

FIG. 13 is a planar view of a permanent magnet 55 inclusive of the main magnetic pole portion 44 and auxiliary pole portions 45. The various exterior surfaces, i.e. 55a, 55b, 55c and 55d, defining permanent magnet 55 are perhaps best seen in end view 14 and edge view 15. Permanent magnet 55 is also shown as a perspective view in FIG. 16.

The hole 12 is formed in an approximately semicylindrical shape and is defined by a straight surface 15 extending in the tangential direction; cut surfaces 16 formed at opposite ends of the straight surface 15; tapered surfaces 17 extending obliquely outward from the cut surfaces 16 in a direction approaching each other; and an arcuate surface 18 joining the two tapered surfaces 17 and extending approximately in parallel with the outer circumferential surface of the rotor iron core 11.

Moreover, since the auxiliary pole portions 45 are magnetized, the magnetic fluxes, generated by the auxiliary pole portions 45, flow from the tapered surfaces 55c to the rotor iron core 11 approximately normal to the tapered face (not shown).

Figure 11:
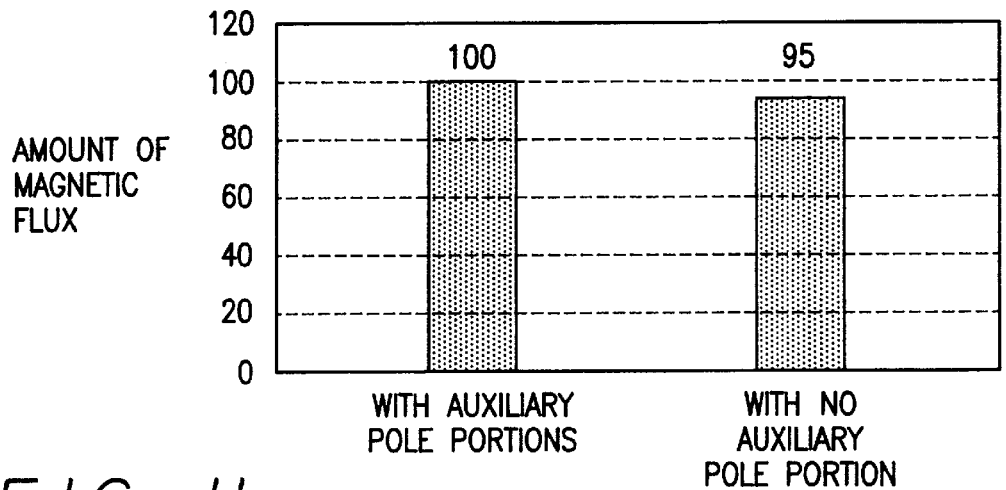
FIG. 11 is a bar graph comparing the amounts of magnetic flux in the second embodiment of the invention with and without auxiliary pole portions.
Figure 12:
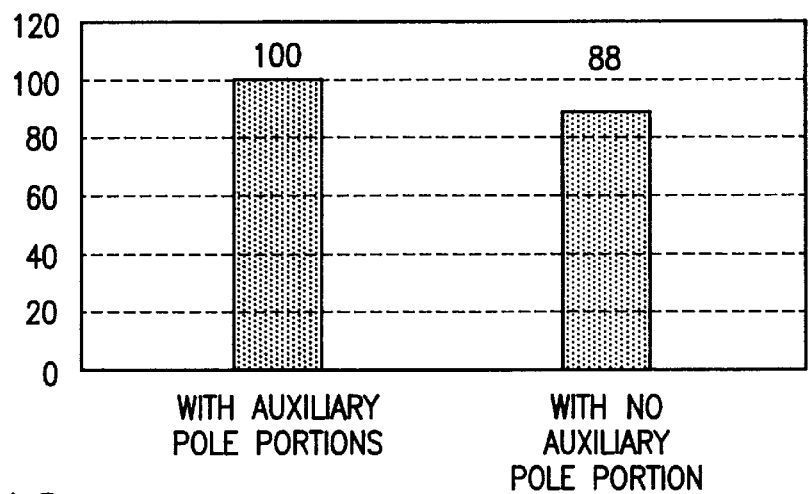
FIG. 12 is a bar graph comparing the motor torques in the second embodiment of the invention with and without auxiliary pole portions.

Thus, the magnetic path can be more saturated in the vicinity of the magnetic pole end portions in the rotor iron core 11, that is, in the vicinity of the auxiliary pole portions 45. As a result, the magnetic fluxes can be prevented from being short-circuiting at the magnetic pole end portions, thus increasing the flow of magnetic flux passing through the gap between the stator 51 (of FIG. 3) and the rotor 10, as shown in FIG. 11, and thereby increasing the motor torque, as shown in FIG. 12. That is, when the amount of magnetic flux is taken as 100 with the auxiliary pole portions 45, the amount of magnetic flux without the same becomes 95. When the motor torque is taken as 100 with the auxiliary pole portions 45, without the same the motor torque becomes 88.

Since the main magnetic pole portion 44 and the auxiliary pole portions 45 are integral, the permanent magnet type synchronous motor 115 can be simplified in its structure by reduction of the number of parts and of the assembly steps, to lower the cost of the permanent magnet type synchronous motor 115.

The auxiliary pole portions 45 are formed with bends at the junctures between the tapered surfaces 55c and the arcuate surface 55d which bends serve as boundaries, so that the distance between the N poles and the S poles in the auxiliary pole portions 45 can be shortened. As a result, not only the volume of the magnets in the auxiliary pole portions 45 can be reduced but also the distance between the outer circumference of the rotor iron core 11 and the auxiliary pole portions 45 can be lengthened, so that the magnetic path can be sufficiently saturated.

In addition, the inter-pole distance around the circumference of the rotor 37 can be lengthened to enhance the strength of the rotor iron core 11.

The permanent magnets 55 are supported on the tapered surfaces 17, and centrifugal forces which are generated in the permanent magnets 55 as the rotor 10 is rotated are borne by the tapered surfaces 17 rather than by the arcuate surface 18, Because the arcuate surface 18 makes no contribution to the support of the permanent magnets 55, the core portion adjoining surface 18 is protected against breakage. Moreover, a small clearance is formed between the individual arcuate surfaces 18 and 55d, so that the surfaces 18 and 55d need not be finished with great precision.

Each of the tapered surfaces 17 is inclined from the cut surfaces 16 in a direction approaching each other, so that a sufficient thickness can be retained between the tapered surfaces 17 and the outer circumferential surface of the rotor iron core 11. As a result, the tapered surfaces will not break even if the rotor 10 is rotated at a high speed to apply a high centrifugal force to the core portions radially outward of tapered surfaces 17. Moreover, the cut surfaces 16 and the tapered surfaces 17 join at obtuse angles, as do the tapered surfaces 17 and the arcuate surface 18, so that the stress is prevented from being concentrated. This makes it possible to enhance the strength of the rotor iron core 11 adjacent the tapered surfaces 17.

The arcuate portions above the arcuate surfaces 18 cover the permanent magnets 55 radially outward of the permanent magnets 55, so that if the permanent magnets 55 are broken or smashed due to internal defects or excessive rotation of the rotor 10, the resulting fragments are prevented from being scattered. In this case, it is sufficient that the arcuate portions radially outward of arcuate surfaces 18 merely cover the permanent magnets 55, so that their radial dimension can be reduced, allowing reduction of the radial dimension of the tapered surfaces 17. As a result, the leakages of magnetic flux from the arcuate surfaces 18 can be reduced to increase the amount of magnetic flux passing through the gap between the stator 51 and the rotor 10, so that the torque generated by the permanent magnet type synchronous motor 115 (of FIG. 2) is increased by a corresponding amount. In addition, distortion in the magnetic flux distribution within the gap can be remarkably reduced to reduce the harmonic components in the waveforms of the magnetic flux density, to thereby prevent torque oscillations.

If a low current is introduced through the coils 39, as in the case when permanent magnet type synchronous motor 115 is driven in a low torque region, a portion of the magnetic flux from the arcuate surfaces 18 does not pass through the stator iron core 52 but, rather, short-circuits the rotor iron core 11. This short-circuiting and the substantial reduction in the air gap length, which serves to lower the magnetic resistance, act together to lower the counter electromotive force, so that the speed of rotation of the rotor 10 can be increased without raising the supply voltage. As a result, the d-axis current, used for a field-weakening control, can be accordingly reduced to enhance the efficiency of the permanent magnet type synchronous motor 115.

Figure 10:
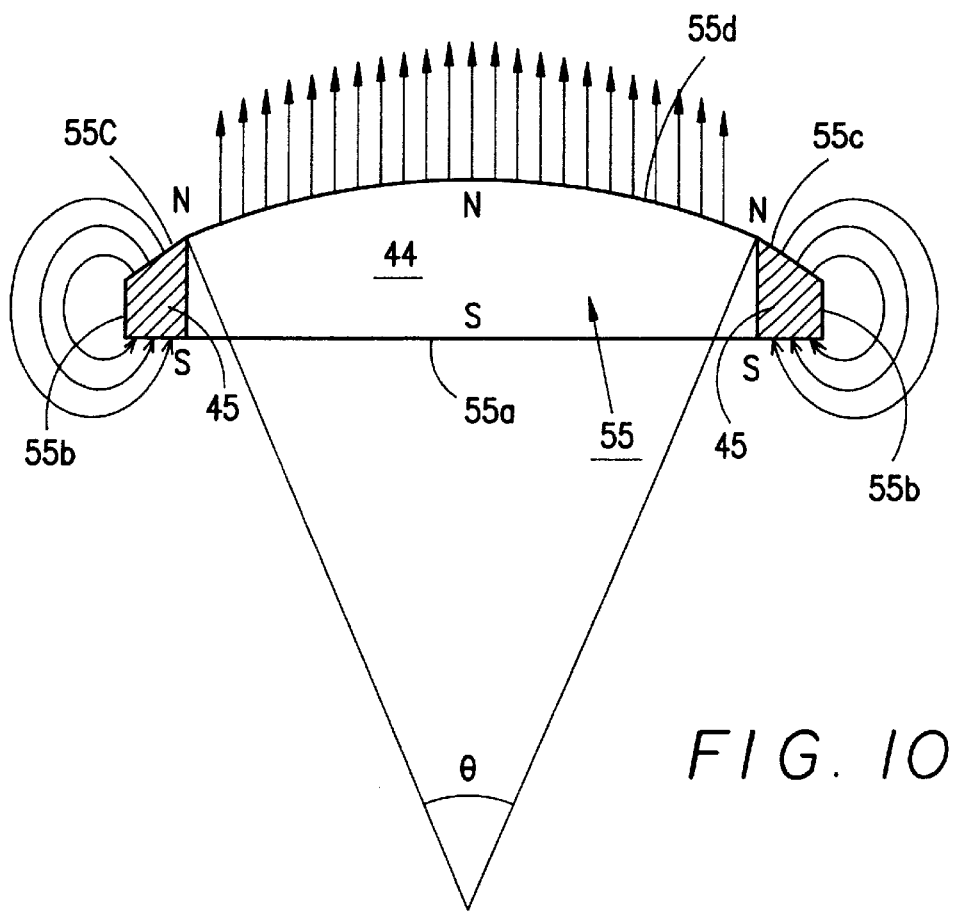
FIG. 10 is a diagram illustrating the magnetic flux pattern produced in the second embodiment of the invention.

Referring to FIG. 10, if the angle through which the main magnetic pole portion 44 extends circumferentially (between ends of arcuate surface 55*d*) is designated as θ and if the pitch of the individual stator poles 53 of the stator iron core 52, i.e., the slot pitch, is designated as p, then the angle θ is expressed as follows:

θ≈(n+½)·p (n: an integer).

In this case, if the rotor 37 is rotated to any location relative to the stator 51, the number of slots between each of the stator poles 53 of the stator iron core 52 confronting the main magnetic pole portions 44 is always the constant value n. As a result, the generation of cogging torque is suppressed, thereby suppressing the generation of vibrations.

The invention is not limited to the foregoing embodiments but can be modified in various manners consistent with its spirit, and these modifications are not excluded from the scope of the invention.

The entire disclosures of Japanese Patent Application No. 9-317120 filed on Nov. 18, 1997 and Japanese Application No. 9-37945 filed Feb. 21, 1997, including the specifications, claims and drawings, are incorporated herein by reference.

While the invention has been described with reference to preferred embodiments, the foregoing embodiments are merely illustrative of the invention and should not be construed as limiting the invention. Various modifications and applications may be adopted by those skilled in the art without departing from the true spirit and scope of the invention as defined by the appended claims.

What is claimed is:

1. A permanent magnet type synchronous motor comprising:

a rotor iron core having a plurality of circumferentially spaced holes, said holes being defined by opposing arcuate and flat surfaces and by opposing tapered surfaces extending from said flat surface, at opposite sides of said hole, toward each other and joining said arcuate and flat surfaces;

a plurality of permanent magnets, each permanent magnet being mounted in a respective one of said holes;

a stator iron core; and coils arranged in said stator iron core;

where each of said permanent magnets is defined by a flat surface extending widthwise relative to the rotor iron core, tapered surfaces formed at both ends of said flat surface and extending obliquely outward in a direction approaching each other, and an arcuate surface joining said two tapered surfaces, and being supported at opposing ends by said tapered surfaces of one of said holes, the arcuate surfaces of the permanent magnets being spaced from the arcuate surfaces of the holes.

2. A permanent magnet type synchronous motor as set forth in claim 1, wherein each of said permanent magnets is magnetized to one polarity at the tapered surfaces and the arcuate surface of the permanent magnet and is magnetized to the opposite polarity at its flat surface.

3. A permanent magnet type synchronous motor comprising:

a rotor including a rotor iron core defining an outer circumferential surface and having a plurality of holes defined in part by opposing, tapered end surfaces, said holes being circumferentially spaced adjacent and radially inward of the outer circumferential surface of said rotor iron core, and permanent magnets mounted within said holes and supported by said opposing tapered end surfaces; and a stator arranged around said outer circumferential surface of said rotor and including a stator iron core and coils wound on said stator iron core, each of said permanent magnets including a main magnetic pole portion, and auxiliary pole portions integral with said main magnetic pole portion at end portions thereof and tapered at least in part, said auxiliary pole portions being bent to form boundaries and magnetized to the same polarity as that of said main magnetic pole portion, so that the magnetic paths at said end portions are saturated by the magnetic fluxes from said auxiliary pole portions.

4. A permanent magnet type synchronous motor as set forth in claim 3, wherein said stator iron core has internal slots defining a slot pitch p and wherein said main magnetic pole portion has a circumferential length which extends through an angle θ defined as:

θ=(n+½)·p wherein n is the number of said internal slots confronting said main magnetic pole portion.

* * * * *